United States Patent [19]
Murachi et al.

[11] Patent Number: 5,746,989
[45] Date of Patent: May 5, 1998

[54] METHOD FOR PURIFYING EXHAUST GAS OF A DIESEL ENGINE

[75] Inventors: Mikio Murachi, Toyota; Seiji Okawara, Susono; Koichi Kojima, Susono; Takuya Kondo, Susono, all of Japan

[73] Assignee: Toyota Jidosha Kabushiki Kaisha, Toyota, Japan

[21] Appl. No.: 681,957

[22] Filed: Jul. 30, 1996

[30] Foreign Application Priority Data

Aug. 14, 1995 [JP] Japan ................. 7-207108

[51] Int. Cl.⁶ .................... B01D 53/92; B01D 53/94
[52] U.S. Cl. ................ 423/212 R; 423/212 C; 423/213.7; 423/215.5; 423/239.1; 423/245.3
[58] Field of Search ............ 423/212 C, 212 R, 423/215.5, 213.7, 239.1, 245.3

[56] References Cited

U.S. PATENT DOCUMENTS

| 4,270,936 | 6/1981 | Mann | 55/520 |
|---|---|---|---|
| 4,902,487 | 2/1990 | Cooper et al. | 423/215.5 |
| 5,472,673 | 12/1995 | Goto et al. | 422/169 |

FOREIGN PATENT DOCUMENTS

| 0 341 832 A2 | 11/1989 | European Pat. Off. | |
| 0573672 | 12/1993 | European Pat. Off. | 423/239.1 |
| 1-318715 | 12/1989 | Japan | |
| 3-124909 | 5/1991 | Japan | |
| 3135417 | 6/1991 | Japan | 423/239.1 |
| 4141218 | 5/1992 | Japan | 423/239.1 |
| 6-159037 | 6/1994 | Japan | |
| 6-272541 | 9/1994 | Japan | |
| 7-139342 | 5/1995 | Japan | |
| WO 93/07363 | 4/1993 | WIPO | |
| 9427710 | 12/1994 | WIPO | 423/239.1 |
| WO 95/18292 | 7/1995 | WIPO | |

*Primary Examiner*—Gary P. Straub
*Assistant Examiner*—Timothy C. Vanoy
*Attorney, Agent, or Firm*—Oliff & Berridge, PLC

[57] ABSTRACT

According to the method of the present invention, NO (nitrogen monoxide) in the exhaust gas of a diesel engine is first oxidized to $NO_2$ (nitrogen dioxide) by an oxidizing catalyst. Further, carbon particles in the exhaust gas are trapped by a DPF (diesel particulate filter). The exhaust gas containing $NO_2$ formed by oxidation of nitrogen monoxide is, then, fed to the DPF, and $NO_2$ in the exhaust gas reacts with the carbon particles trapped in the DPF. When the $NO_2$ reacts with carbon particles, carbon particles are oxidized (burned) by $NO_2$ and removed from DPF, and, at the same time, $NO_2$ is reduced to NO by the carbon particles. The exhaust gas containing NO formed by the reaction between the carbon particles and $NO_2$ is fed to an $NO_X$ absorbent. In the $NO_X$ absorbent, NO is absorbed by the $NO_X$ absorbent and, thereby, removed from the exhaust gas. Therefore, according this method, the carbon particles collected by the DPF can be easily burned by $NO_2$, thereby being removed from the DPF without increasing the amount of NO released to the atmosphere.

5 Claims, 6 Drawing Sheets

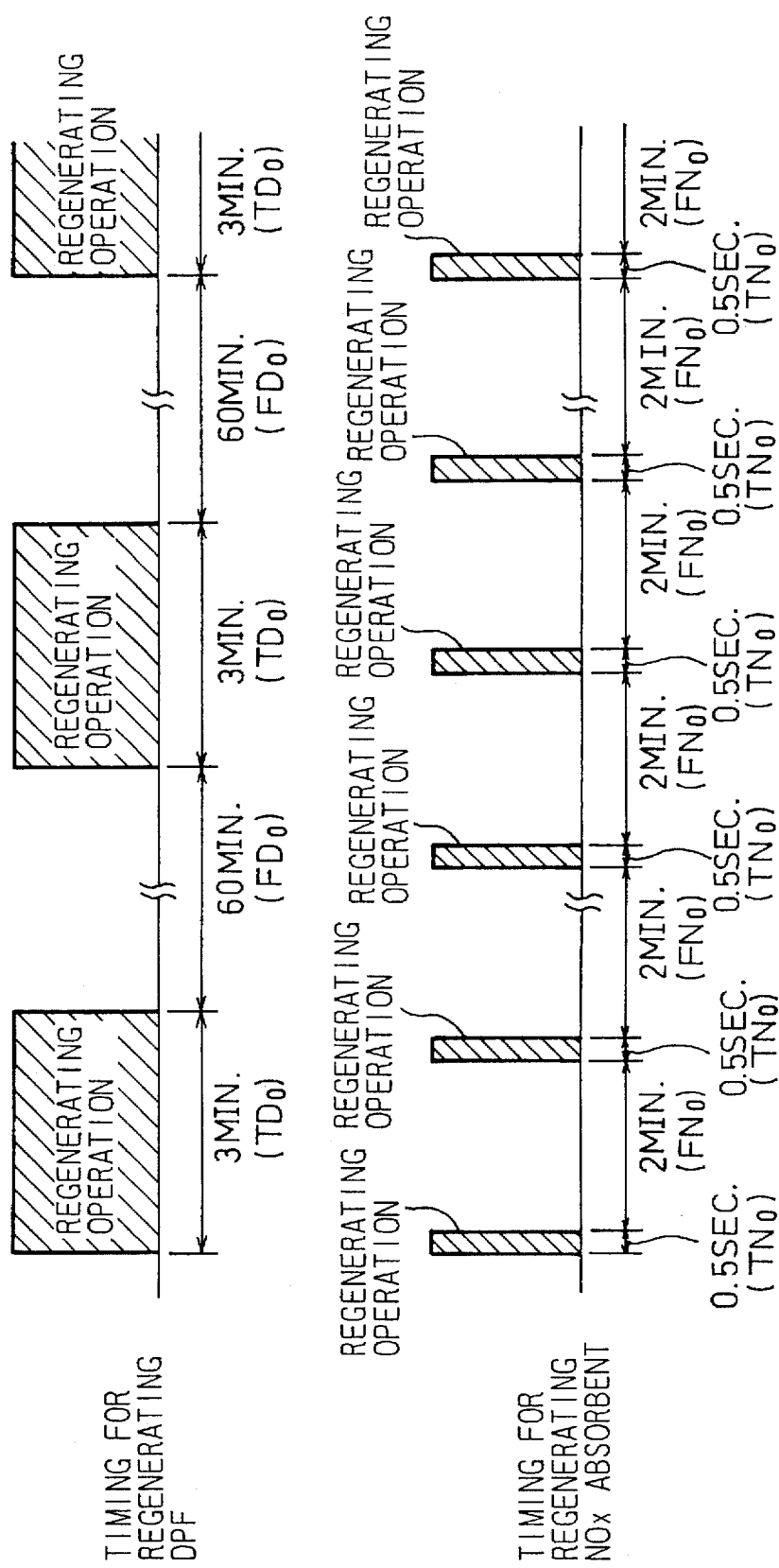

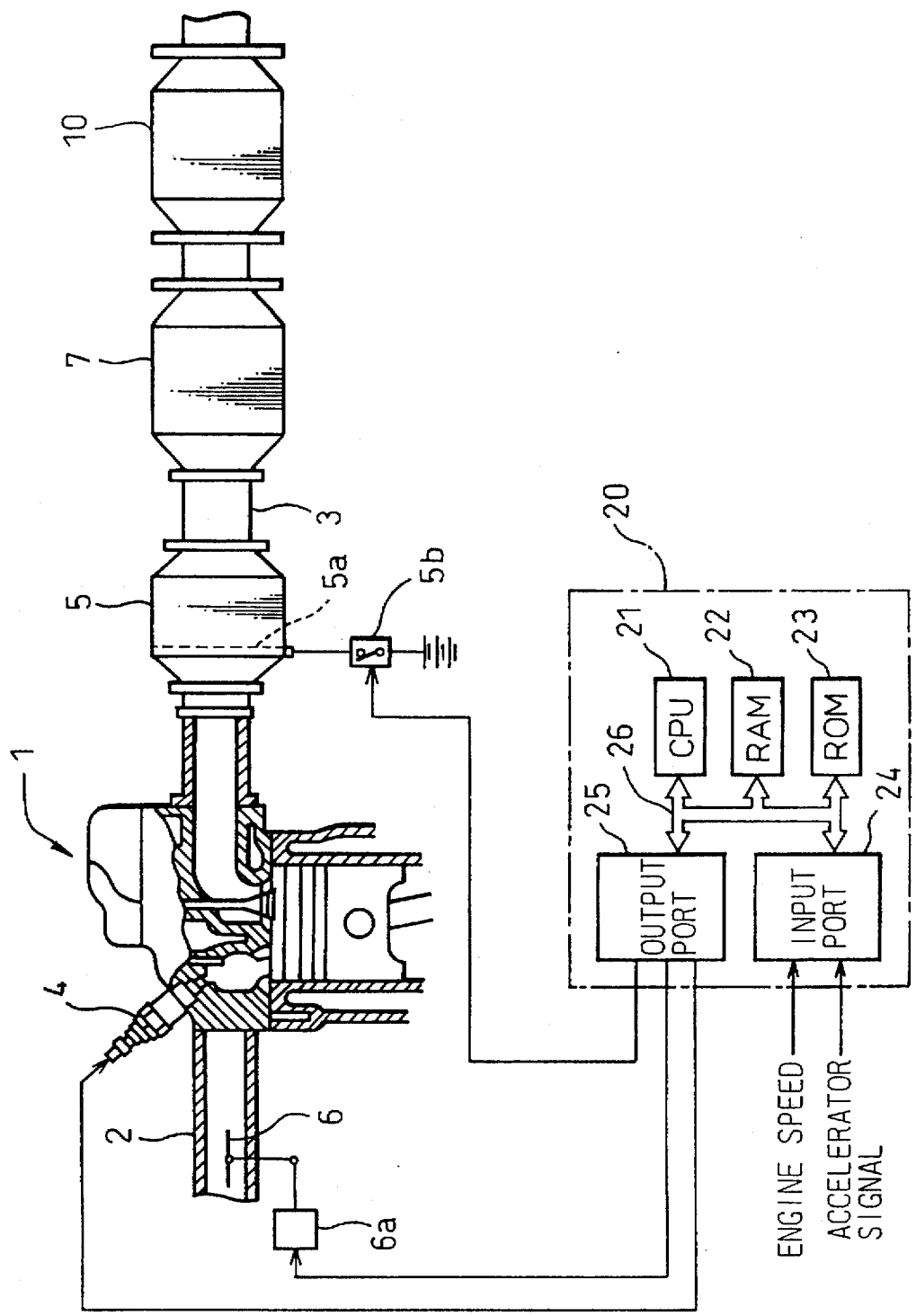

METHOD FOR PURIFYING EXHAUST GAS OF A DIESEL ENGINE

BACKGROUND OF THE INVENTION

1. Field of the Invention

The present invention relates to a method for purifying the exhaust gas of a diesel engine. More specifically, the present invention relates to a method for purifying the exhaust gas of a diesel engine which is capable of removing both carbon particles and nitrogen oxide contained in the exhaust gas.

2. Description of the Related Art

A method for removing carbon particles (i.e., soot) from the exhaust gas of a diesel engine is disclosed in, for example, Japanese Unexamined Patent Publication (Kokai) No. 1-318715.

In the '715 publication, an oxidizing catalyst and a DPF (diesel particulate filter) are disposed in the exhaust gas passage of a diesel engine, from the upstream side, in this order. The DPF is a filter for collecting and removing diesel particulates which mainly consist of carbon particles (i.e., soot) from the exhaust gas. In the '715 publication, NO (nitrogen monoxide) in the exhaust gas of the diesel engine is oxidized by the oxidizing catalyst and forms $NO_2$ (nitrogen dioxide) in the exhaust gas. Therefore, exhaust gas containing $NO_2$ flows into the DPF. This $NO_2$ reacts with the carbon particles trapped in the DPF and, thereby, the carbon particles are burned and removed from the DPF. Therefore, the carbon particles are not accumulated in the DPF.

Heretofore, it is considered that a temperature higher than a normal exhaust gas temperature is required for burning the carbon particles trapped in the DPF. However, the method in the '715publication makes it possible to burn the carbon particles in the DPF at a temperature available in the normal operation of the engine (for example, less than 300° C.) by reacting $NO_2$ in the exhaust gas with the carbon particles in the DPF. Therefore, no heating means such as an electric heater is required for heating the DPF in order to initiate combustion of the carbon particles. Thus, according to the method in the '715 publication, the carbon particles can be removed from the exhaust gas by a simple device.

However, though the method in the '715 publication can remove the diesel particulates in the exhaust gas, it cannot prevent nitrogen oxide in the exhaust gas from being released into the atmosphere.

In the method in the '715 publication, $NO_2$ in the exhaust gas burns the diesel particulates consisting of carbon particles by the reactions $NO_2+C \rightarrow NO+CO$ and, $2NO_2+2C \rightarrow N_2+2CO_2$. However, it was found that the reaction $2NO_2+2C \rightarrow N_2+2CO_2$ hardly occurs at a relatively low temperature (such as an exhaust gas temperature available in the normal operation of the diesel engine). Therefore, if the method in the '715 publication is applied to a diesel engine, a major portion of $NO_2$ in the exhaust gas flowing into the DPF is converted to NO by the reaction $NO_2+C \rightarrow NO+CO$ and, thereby, the amount of NO in the exhaust gas released to the atmosphere increases.

Further, since diesel fuel contains a relatively large amount of sulfur, $SO_2$ (Sulfur dioxide) is contained in the exhaust gas of a diesel engine. Therefore, if an oxidizing catalyst is used for oxidizing NO to $NO_2$ in the exhaust gas as in the method in the '715 publication, $SO_2$ in the exhaust gas is also oxidized by the oxidizing catalyst and forms sulfate ($SO_3$) in the exhaust gas. The sulfate in the exhaust gas is not collected by the DPF and is released to the atmosphere. Further, since sulfate is detected as particulate matter, the amount of the diesel particulates released to the atmosphere increases due to sulfate formed by the oxidizing catalyst if the method in the '715 publication is applied to the diesel engine.

SUMMARY OF THE INVENTION

In view of the problems in the related art as set forth above, the object of the present invention is to provide a method for purifying the exhaust gas of a diesel engine which is capable of easily removing the diesel particulates collected by the DPF without increasing the amounts of nitrogen oxide and sulfate released to the atmosphere.

This object is achieved by a method, for purifying the exhaust gas of a diesel engine, in which the method comprises a step for oxidizing nitrogen monoxide in the exhaust gas of a diesel engine into nitrogen dioxide, thereby forming nitrogen dioxide in the exhaust gas, a step for collecting carbon particles contained in the exhaust gas, a step for reacting nitrogen dioxide in the exhaust gas formed by oxidation of nitrogen monoxide with the collected carbon particles, thereby oxidizing the collected carbon particles by nitrogen dioxide in the exhaust gas and, at the same time, reducing nitrogen dioxide in exhaust gas to nitrogen monoxide, and a step for removing nitrogen monoxide formed by the reaction between nitrogen dioxide and the collected carbon particles from the exhaust gas.

According to the present invention, diesel particulates in the exhaust gas of a diesel engine which is mainly consist of carbon particles is collected, for example, by a DPF. Nitrogen dioxide formed by the oxidation of nitrogen monoxide reacts with the collected carbon particles, and the carbon particles are oxidized (i.e., burned) at a relatively low temperature. When nitrogen dioxide and the collected carbon particles react each other, carbon particles are oxidized to carbon monoxide or carbon dioxide and, at the same time, nitrogen dioxide is reconverted to carbon monoxide and nitrogen monoxide, respectively. In this embodiment, this nitrogen monoxide is removed from the exhaust gas in the final step. Therefore, nitrogen monoxide is not released to the atmosphere.

According to one aspect of the present invention, nitrogen monoxide generated by the reaction between nitrogen dioxide and the carbon particles is collected by, for example, $NO_X$ absorbent which absorbs nitrogen oxide in the exhaust gas. Further, according to another aspect of the present invention, nitrogen monoxide generated by the reaction between nitrogen dioxide and the carbon particles are reduced to nitrogen by, for example, an $NO_X$ reducing catalyst which has a capability for selectively reducing nitrogen oxide in the exhaust gas even in an oxidizing atmosphere.

BRIEF DESCRIPTION OF THE DRAWINGS

The present invention will be better understood from the description as set forth hereinafter, with reference to the accompanying drawings in which:

FIG. 5 is a timing diagram illustrating timing for regeneration of the DPF and the $NO_x$ absorbent;

FIG. 6 is a drawing similar to FIG. 1 which illustrates another embodiment of a device for conducting the method in the present invention.

DESCRIPTION OF THE PREFERRED EMBODIMENT

Figure 1:
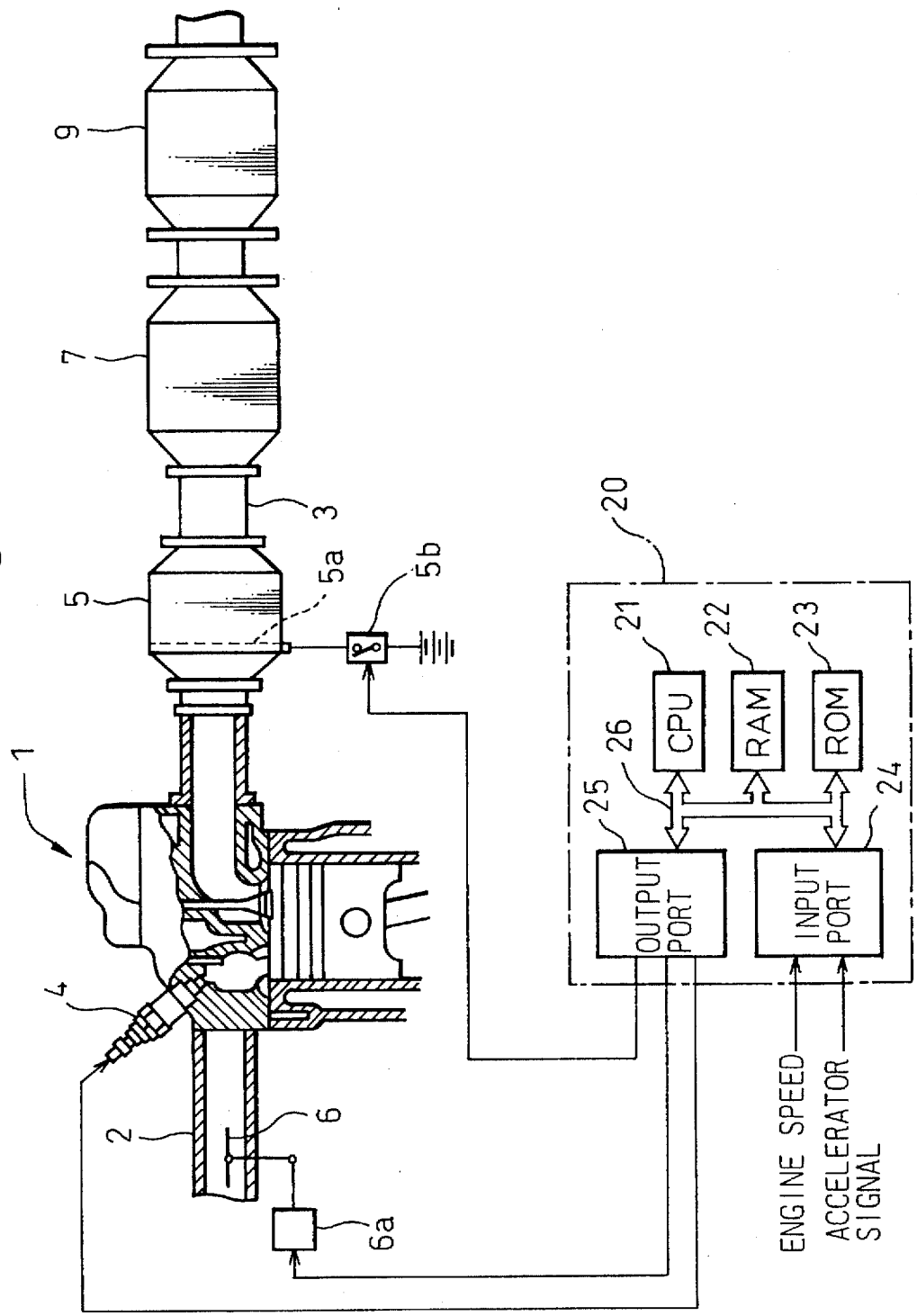
FIG. 1 schematically illustrates an embodiment of a device for conducting the method in the present invention when applied to an automobile diesel engine.

FIG. 1 shows an embodiment of an exhaust gas purification device which utilizes the method of the present invention.

In FIG. 1, reference numeral 1 designates a diesel engine for an automobile. Though a multiple cylinder diesel engine is used in this embodiment, FIG. 1 shows one cylinder only. Numerals 2 and 3 designate an intake air passage and an exhaust gas passage, respectively. A fuel injection valve 4, which injects pressurized fuel into a combustion chamber, is provided on each of the cylinders.

In this embodiment, an intake shutter valve 6 is disposed in the intake air passage 2. The intake shutter valve 6 is a type, such as a butterfly valve, which generates low flow resistance when open, and is used for throttling the intake air passage 2 to reduce the amount of intake air during the regenerating operation of the DPF. By reducing the amount of intake air, temperature of the exhaust gas becomes high, and combustion of the carbon particles in the DPF is facilitated. In FIG. 1, the numeral 6a is an actuator of appropriate type, such as a vacuum actuator or solenoid actuator, which opens and closes the intake shutter valve 6 in accordance with a control signal supplied by a control circuit 20.

In the exhaust gas passage 3, an oxidizing catalyst 5 for oxidizing NO (nitrogen monoxide) in the exhaust gas to $NO_2$ (nitrogen dioxide), a DPF (diesel particulate filter) 7 for collecting the diesel particulates in the exhaust gas and an $NO_x$ absorbent 9 for collecting (absorbing) $NO_x$ (nitrogen oxide) in the exhaust gas are disposed in this order from the upstream end. The oxidizing catalyst 5, the DPF 7 and the $NO_x$ absorbent 9 are explained later in detail.

The control circuit 20 may consist of, for example, a microcomputer of a known type and comprises a CPU (a microprocessor) 21, a RAM (a random access memory) 22, a ROM (read-only memory) 23, an input port 24 and an output port 25 all connected each other by a bi-directional bus 26. The control circuit 20 performs the basic control of the engine 1 such as fuel injection control. In this embodiment, the control circuit 20 further performs regeneration control of the DPF 7 and $NO_x$ absorbent 9. In this embodiment, as explained later, an operation for burning the carbon particles (diesel particulate) collected in the DPF 7 is referred to as "a regeneration of the DPF", and an operation for causing $NO_x$ absorbent to release the absorbed $NO_x$ is referred to as "a regeneration of the $NO_x$ absorbent".

In order to perform these types of control, an engine speed signal and an accelerator signal are supplied to the input port 24 of the control circuit 20 from the respective sensors not shown in the drawing. Further, the output port 25 is connected to the fuel injection valve 4 of the engine 1 and the actuator 6a of the intake shutter valve 6, respectively, via the respective drive circuits not shown in the drawing, in order to control the amount and timing of fuel injection and the operation of the intake shutter valve 6.

The oxidizing catalyst 5 uses, for example, a honeycomb type substrate made of cordierite. On this substrate, an alumina layer which acts as a carrier of the catalytic components is applied. In this embodiment, catalytic components of precious metals such as platinum (Pt) or palladium (Pd) are attached to the alumina carrier. The oxidizing catalyst 5 oxidizes HC and CO in the exhaust gas when the air-fuel ratio of the exhaust gas is lean. Further, the oxidizing catalyst 5 oxidizes NO in the exhaust gas and converts it to $NO_2$. In this embodiment, the term "air-fuel ratio of the exhaust gas" means a ratio of the amounts of air and fuel supplied to the engine and at portions upstream of a considered point in the exhaust system. Therefore, when no secondary air or additional fuel are supplied to the exhaust passage, the air-fuel ratio of the exhaust gas agrees with an operating air-fuel ratio of the engine (i.e., an air-fuel ratio of the air-fuel mixture in the combustion chambers of the engine 1).

Further, in this embodiment, an electric heater 5a is disposed on an upstream side end of the oxidizing catalyst 5. The electric heater 5a is activated in a condition in which the exhaust gas temperature is low, such as at cold start of the engine, to heat the oxidizing catalyst 5 to the activating temperature of the catalyst. The activation of the electric heater 5a is controlled by a control signal from the control circuit 20 supplied to a relay 5b of the electric heater 5a. As explained later, the electric heater 5a is also used in conjunction with the intake shutter valve 6 to raise the exhaust gas temperature when regenerating operation of the DPF 7 is conducted.

DPF 7 is a honeycomb type porous filter made of, for example, cordierite. In the DPF 7, numerous exhaust gas passages are formed in parallel. Approximately half of the exhaust gas passages are plugged at the upstream ends thereof, and the rest of the passages are plugged at the downstream ends thereof. The exhaust gas passages plugged at the upstream ends and the exhaust gas passages plugged at the downstream ends are disposed in the DPF 7 alternately. The exhaust gas of the engine flows into the DPF 7 through the passages having open upstream ends, and flows into the exhaust gas passages having open downstream ends through porous walls separating the exhaust gas passages from each other, and flows out from the DPF 7 through the passages having open downstream ends. Therefore, particles such as the carbon particles are collected by the porous walls of the DPF 7. In this embodiment, the carbon particles collected by the DPF 7 are burned by $NO_2$ in the exhaust gas as explained later. Therefore, to facilitate combustion of the collected carbon particles, oxidizing catalyst such as platinum (Pt) is attached to alumina coating formed on the porous wall.

The $NO_x$ absorbent 9 in this embodiment uses, for example, a honeycomb type substrate made of cordierite. On this substrate, an alumina layer which acts as a carrier of the catalytic components is applied. On this carrier, precious metals such as platinum (Pt) rhodium (Rh), and at least one substance selected from alkali metals such as potassium (K), sodium (Na), lithium (Li) and cesium (Cs); alkali-earth metals such as barium (Ba) and calcium (Ca); and rare-earth metals such as lanthanum (La) and yttrium (Y) is carried. The $NO_x$ absorbent 9 absorbs $NO_x$ (nitrogen oxide) in the exhaust gas when the air-fuel ratio of the exhaust gas is lean, and releases the absorbed $NO_x$ when the oxygen concentration of the exhaust gas flowing the $NO_x$ absorbent becomes lower.

Though the mechanism of this absorbing and releasing operation of the $NO_x$ absorbent is not clear at present, it is thought that the absorbing and releasing operation is conducted by the following mechanism. Though the following mechanism of the absorbing and releasing operation of the $NO_x$ absorbent is explained for the case where platinum Pt and barium Ba are carried on the carrier, as an example, it is thought that a similar mechanism also applies even if other precious metal, alkali metals, alkali earth metals, or rare earth metals are used.

Namely, when the concentration of $O_2$ in the exhaust gas increases, i.e., exhaust gas becomes lean, the oxygen $O_2$ in the exhaust gas is deposited on the surface of platinum Pt in the form of $O_2^-$ or $O^{2-}$. The NO in the exhaust gas reacts with $O_2^-$ or $O^{2-}$ on the surface of the platinum Pt and becomes $NO_2$ by the reaction $2NO+O_2 \rightarrow 2NO_2$. Then, $NO_2$ in the exhaust gas and the $NO_2$ produced on the platinum Pt are further oxidized on the surface of platinum Pt and absorbed into the $NO_x$ absorbent while bonding with the barium oxide BaO and diffusing in the absorbent in the form of nitric acid ions $NO_3$. Thus, $NO_x$ in the exhaust gas is absorbed by the $NO_x$ absorbent 9 when the air-fuel ratio of the exhaust gas is lean.

On the other hand, when the oxygen concentration in the exhaust gas becomes low, i.e., when the air-fuel ratio of the exhaust gas becomes stoichiometric or rich, the production of $NO_2$ on the surface of the platinum Pt is lowered and the reaction proceeds in an inverse direction ($NO_3 \rightarrow NO_2$), and thus nitric acid ions $NO_3$ in the absorbent are released in the form of $NO_2$ from the $NO_x$ absorbent 9.

In this case, if a reducing substance such as CO, or a substance such as HC and $CO_2$ exist in the exhaust gas, released $NO_x$ is reduced on the platinum Pt by these components. Namely, the $NO_x$ absorbent 9 performs the absorbing and releasing operation of the $NO_x$ in the exhaust gas in which the $NO_x$ in the exhaust gas is absorbed by the $NO_x$ absorbent when the air-fuel ratio of the exhaust gas is lean and, released from the $NO_x$ absorbent and reduced to $N_2$ when the air-fuel ratio of the exhaust gas becomes stoichiometric or rich.

Since a diesel engine is used in this embodiment, the air-fuel ratio of the exhaust gas in a normal operation is considerably lean compared to the stoichiometric air-fuel ratio (for example, an air-fuel ratio of about 30). Further, the exhaust gas at the outlet of a diesel engine contains a small amount of $NO_x$ (mainly NO) and a relatively large amount of the diesel particulates (carbon particles). This exhaust gas is first supplied to the oxidizing catalyst 5, and NO in the exhaust gas is oxidized to $NO_2$ by the reaction $2NO+O_2 \rightarrow 2NO_2$. Thus, NO in the exhaust gas is converted to $NO_2$ by the oxidizing catalyst 5.

The exhaust gas containing $NO_2$, then, flows into the DPF 7, where the carbon particles in the exhaust gas are collected by the DPF 7. A portion of the carbon particles collected by DPF 7 reacts with $NO_2$ in the exhaust gas, and generates NO and CO by the reaction $NO_2+C \rightarrow NO+CO$ as explained before.

However, since the amount of NO emitted from the engine in the normal operation of the diesel engine is smaller compared to the amount of carbon particles, and since the temperature of the exhaust gas in a normal operation of the engine is low (for example, about 200° C.), the reaction $NO_2+C \rightarrow NO+CO$ is not very likely to occur in the normal operation of the engine. Therefore, collected carbon particles gradually accumulate in the DPF 7. Further, the exhaust gas flowing out from the DPF 7 contains $NO_2$ which did not react with the carbon particles and NO generated by the above-explained reaction.

This exhaust gas, then, flows into the $NO_x$ absorbent 9. Since the air-fuel ratio of the exhaust gas of the diesel engine 1 is lean in the normal operation, NO and $NO_2$ in the exhaust gas are absorbed by the $NO_x$ absorbent 9 as explained before, and removed from the exhaust gas. Therefore, the exhaust gas flowing out from the $NO_2$ absorbent 9 is practically free from $NO_x$ and the carbon particles.

Though the carbon particles and $NO_x$ are removed from the exhaust gas by the DPF 7 and $NO_x$ absorbent 9, respectively, the carbon particles and $NO_x$ gradually accumulate in the DPF 7 and $NO_x$ absorbent 9. When the carbon particles accumulate in the DPF 7, a pressure drop through the DPF 7 increases, and the engine output is lowered due to an increase in the exhaust back pressure. Further, when an amount of $NO_x$ accumulates in the $NO_x$ absorbent 9, the capability of the $NO_x$ absorbent 9 for absorbing $NO_x$ in the exhaust gas becomes lower, and a portion of $NO_x$ in the exhaust gas is released to the atmosphere without being absorbed by the $NO_x$ absorbent 9.

In order to prevent these problems, the DPF 7 and $NO_x$ absorbent 9 are regenerated periodically in this embodiment. In the regenerating operation of the DPF 7, the carbon particles accumulated in the DPF are burned, and removed from the DPF 7, thereby, the pressure drop through the DPF 7 is reduced to a normal value. In the regenerating operation of the $NO_x$ absorbent 9, $NO_x$ absorbed by the $NO_x$ absorbent is released and, at the same time, reduced to $N_2$, therefore, the $NO_x$ absorbing capability is resumed.

Next, the regenerating operations of the DPF 7 and $NO_x$ absorbent 9 are explained.

In this embodiment, the regeneration of the $NO_x$ absorbent 9 is conducted by shifting the air-fuel ratio of the exhaust gas to a rich air-fuel ratio side compared to the stoichiometric air-fuel ratio for a short period. When the air-fuel ratio of the exhaust gas becomes rich, the concentration of $O_2$ in the exhaust gas becomes lower, and the concentration of HC and CO in the exhaust gas becomes higher. Since the air-fuel ratio of the exhaust gas is rich, oxidation of HC and CO does not occur in the oxidizing catalyst 5. Therefore, most of HC and CO in the exhaust gas passes through the oxidizing catalyst 5 and the DPF 7, and the exhaust gas containing a relatively small amount of $O_2$ and a relatively large amount of HC and CO flows into the $NO_x$ absorbent 9. When this exhaust gas flows into the $NO_x$ absorbent 9, $NO_x$ is released from the $NO_x$ absorbent 9 and reduced by HC and CO in the exhaust gas, i.e., the $N_x$ absorbent 9 is regenerated.

In this embodiment, the air-fuel ratio of the exhaust gas is enriched by injecting fuel from the fuel injection valve 4 two times in every cycle of each cylinder. In the normal operation of the engine, the fuel injection amount TAU is determined by the control circuit 20 in accordance with the accelerator signal (i.e., the amount of depression of the accelerator pedal) and the engine speed based on a predetermined relationship. This amount of fuel is injected into each cylinder at a later stage in the compression cycle. In the normal operation, the fuel injection amount TAU is determined so that the air-fuel ratio of the engine becomes considerably lean (about an air-fuel ratio of 30). It may be possible to make the engine operating air-fuel ratio rich by increasing the amount of fuel injected in the compression cycle. However, if the amount of fuel injected in the compression cycle is increased, the engine output torque also increases by the amount corresponding to the increased fuel and, thereby, problems such as a torque shock or a reduction in the service lives of parts of the engine will occur.

Therefore, in this embodiment, the engine operating air-fuel ratio is enriched by injecting fuel from the fuel injection valve 4 in the exhaust cycle of each cylinder in addition to the normal fuel injection at a later stage of the compression cycle. When fuel is injected in the exhaust cycle, only a small amount of fuel is burned, and the engine output torque does not increase. Further, most of the injected fuel is vaporized in the cylinder and discharged from the engine with the exhaust gas. This fuel is decomposed by the oxidizing catalyst 5 and generates a large amount of HC and CO in the exhaust gas. Therefore, since the exhaust gas flowing into the $NO_X$ absorbent 9 contains a large amount of HC and CO, and a small amount Of $O_2$, the $NO_X$ absorbent 9 is regenerated in a short time.

The amount of $NO_X$ released from the $NO_X$ absorbent 9 becomes larger as the degree of richness of the exhaust gas becomes higher (i.e., the air-fuel ratio of the exhaust gas becomes lower). Therefore, the time required for regenerating the $NO_X$ absorbent 9 becomes shorter as the degree of richness of the exhaust gas becomes higher. Further, the time required for regenerating the $NO_X$ absorbent 9 becomes shorter as the amount of $NO_X$ absorbed in the $NO_X$ absorbent is smaller. Therefore, in this embodiment, the regenerating operation of the $NO_X$ absorbent 9 is conducted at intervals of between ten seconds to several minutes, and the air-fuel ratio of the exhaust gas is maintained at about 13 (a rich air-fuel ratio) for about 0.5 seconds during the regenerating operation.

Next, the regenerating operation of the DPF 7 is explained. As explained before, the carbon particles collected in the DPF 7 are burned by reaction with the $NO_2$ in the exhaust gas in this embodiment. Further, NO generated by the reaction between the carbon particles and $NO_2$ is absorbed by the $NO_X$ absorbent 9 disposed downstream of the DPF 7. Therefore, it is necessary that the air-fuel ratio of the exhaust gas during the regenerating operation of the DPF 7 is lean. Further, it is preferable to maintain the exhaust gas at a high temperature in order to promote the combustion of the carbon particles. Therefore, the additional fuel injection during the exhaust cycle is also performed during the regenerating operation of the DPF 7 in order to raise the exhaust gas temperature. The amount of fuel injected during the exhaust cycle is determined so that the air-fuel ratio of the exhaust gas stays lean compared to the stoichiometric air-fuel ratio. As explained before, most of the fuel injected during the exhaust cycle is discharged from the cylinder without being burned, and this fuel is decomposed (oxidized) by the oxidizing catalyst 5. Therefore, the exhaust gas is heated by the oxidation of the fuel. In this embodiment, in order to raise the exhaust gas temperature further, the intake shutter valve 6 is closed to a predetermined degree of opening and the electric heater 5a is activated during the regenerating operation of the DPF 7. Since the amount of intake air is reduced by the intake shutter valve 6, the temperature of the exhaust gas of the engine becomes higher than the temperature in the normal operation of the engine. Further, since the exhaust gas is heated by the electric heater 5a and the combustion of fuel on the oxidizing catalyst 5, high temperature exhaust gas (for example, 400° to 500° C.) flows into the DPF 7. Therefore, the carbon particles accumulated in the DPF 7 easily react with $NO_2$ in the exhaust gas. Thus, the carbon particles in the DPF 7 are burned and removed from the DPF 7. Further, since the air-fuel ratio of the exhaust gas passing through the DPF 7 is still lean, NO in the exhaust gas generated by the reaction between the carbon particles and $NO_2$ emitted from the diesel engine are absorbed by the $NO_X$ absorbent 9, and $NO_X$ (nitrogen oxide) is not released into the atmosphere during the regenerating operation of the DPF 7. In this embodiment, the regenerating operation of the DPF 7 is conducted at intervals of between ten minutes to several hours. The regeneration of the DPF 7 is accomplished in several minutes, and the air-fuel ratio of the exhaust gas is maintained at about 20 (a lean air-fuel ratio) during the regenerating operation.

The regenerating operation of the $NO_X$ absorbent 9 is conducted at intervals of between ten seconds to several minutes as explained before. Therefore, the regenerating operation of the $NO_X$ absorbent 9 is also conducted during the regenerating operation of the DPF 7. In this case, the amount of the fuel is increased so that the air-fuel ratio of the exhaust gas becomes rich (an air-fuel ratio of about 13) with the intake shutter valve 6 being closed. Therefore, when the regenerating operation of the $NO_X$ absorbent 9 is conducted during the regenerating operation of the DPF 7, the $NO_X$ absorbent 9 is regenerated by the exhaust gas having a higher temperature than that during the normal regenerating operation. The reason why the regenerating operation of the $NO_X$ absorbent 9 is performed even during the regenerating operation of the DPF 7 is explained hereinafter.

The exhaust gas of the diesel engine 1 contains a relatively large amount of $SO_2$ (sulfur dioxide) generated by combustion of sulfur in diesel fuel. $SO_2$ in the exhaust gas is oxidized to $SO_3$ (sulfate) by the oxidizing catalyst 5 during the operation of the engine 1. $SO_3$ is not collected by the DPF 7 and is released to the atmosphere. Further, since $SO_3$ is detected as particulate matter, if an oxidizing catalyst is disposed in the exhaust gas passage of a diesel engine, the amount of the diesel particulates released to the atmosphere increases.

However, in this embodiment, the $NO_X$ absorbent 9 is disposed in the exhaust gas passage downstream of the DPF 7. $SO_3$ in the exhaust gas is also absorbed by the $NO_X$ absorbent 9 by the mechanism same as the absorption of $NO_X$, and held in the $NO_X$ absorbent 9 in the form of sulfate such as $BaSO_4$. Therefore, $SO_3$ formed by the oxidizing catalyst 5 and passing through the DPF 7 is absorbed (collected) by the $NO_X$ absorbent 9 in this embodiment. Namely, sulfate $SO_3$ in the exhaust gas, as well as NO generated by the combustion of the carbon particles, is removed from the exhaust gas by the $NO_X$ absorbent 9.

$SO_3$ absorbed in the $NO_X$ absorbent 9 is also released when the air-fuel ratio of the exhaust gas becomes rich by the same mechanism as that which releases $NO_X$. However, since the sulfate formed in the $NO_X$ absorbent is more stable than the nitrate formed by $NO_X$, a temperature higher than the normal regenerating operation of the $NO_X$ absorbent is required to release sulfate from the absorbent. Therefore, if the normal regenerating operation in which only the air-fuel ratio of the exhaust gas is enriched is conducted, sulfate is not release from the absorbent. This causes accumulation of the $SO_3$ in the $NO_X$ absorbent 9, and eventually, causes saturation of $NO_X$ absorbent 9 with $SO_3$. If the saturation of $NO_X$ absorbent 9 with the absorbed $SO_3$ occurs, the absorbing capacity of the $NO_X$ absorbent for both $SO_3$ and $NO_X$ decreases largely. Therefore, the $NO_X$ absorbent 9 is regenerated at a exhaust gas temperature higher than that in the normal regenerating operation during the regenerating operation of the DPF 7 to release sulfate, as well as $NO_X$, from the $NO_X$ absorbent 9. By regenerating the $NO_X$ absorbent 9 at a high exhaust gas temperature, $SO_3$ absorbed in the absorbent is released in the form of $SO_2$ and thereby, the absorbing capability of the $NO_X$ absorbent 9 is maintained.

Next, actual regenerating operations of the DPF 7 and $NO_X$ absorbent 9 are explained with reference to FIGS. 2 through 4.

Figure 2:
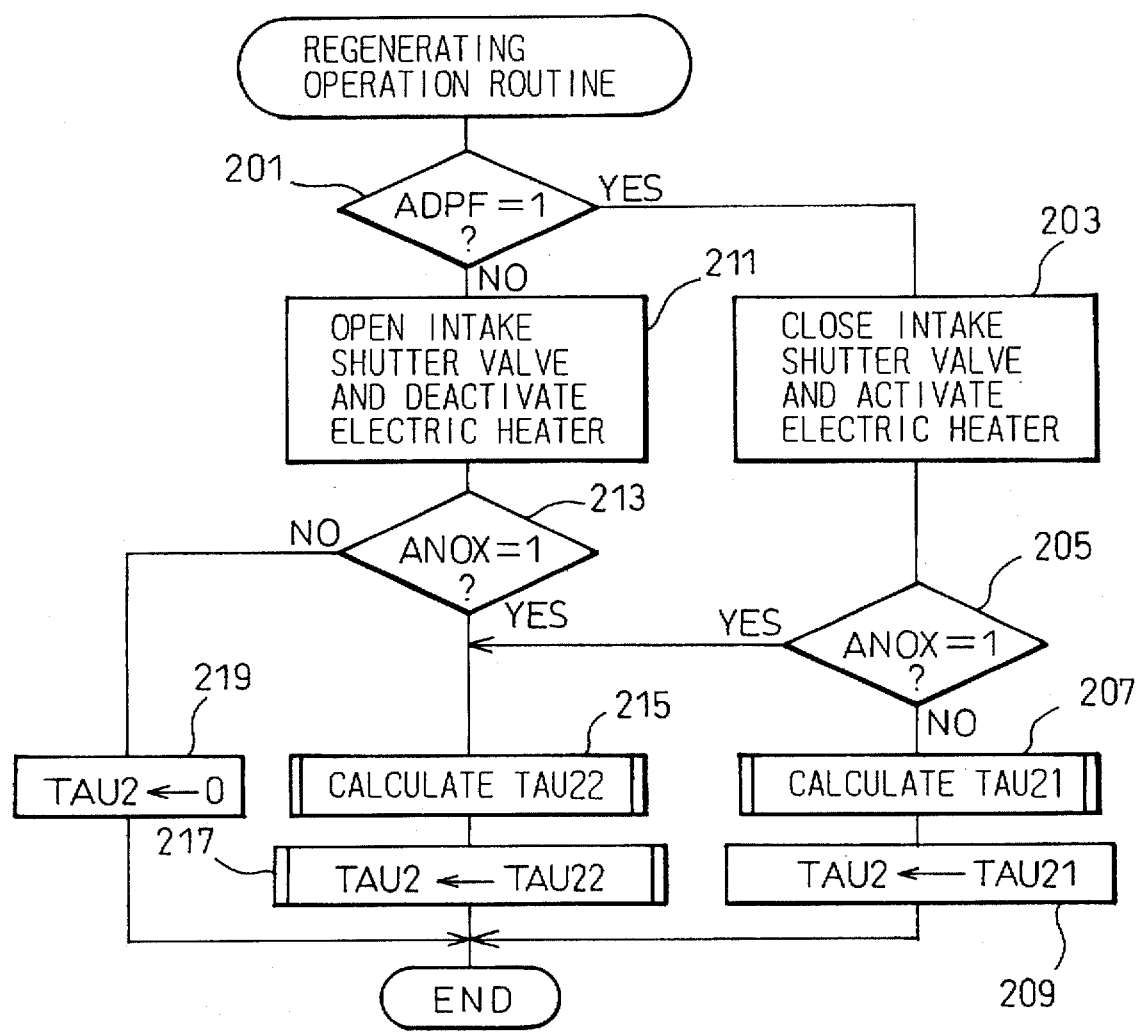
FIG. 2 is a flowchart illustrating a regenerating operation of the DPF and the $NO_X$ absorbent in the embodiment in FIG. 1.
Figure 3:
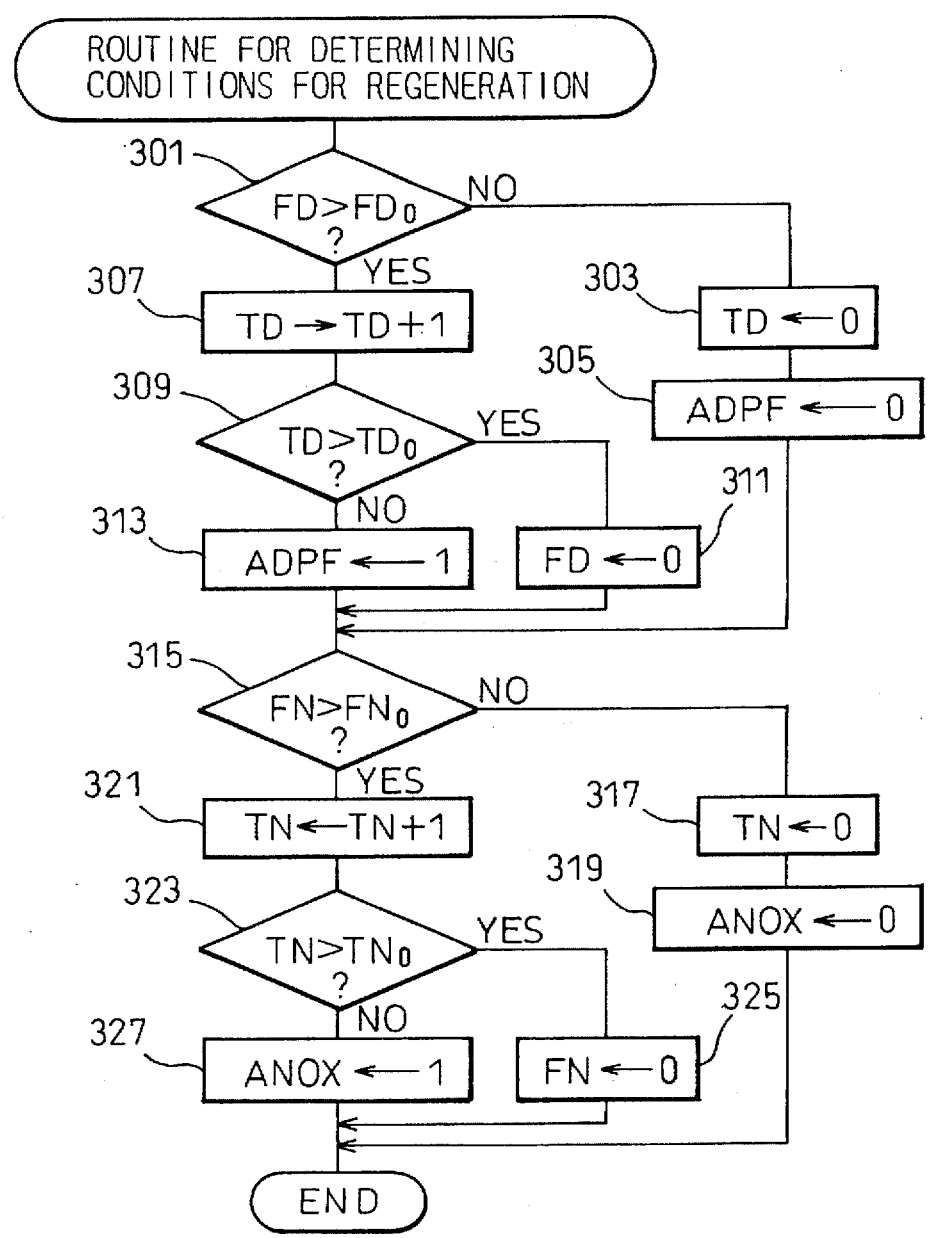
FIG. 3 is a flowchart illustrating a determination of conditions for carrying out the regenerating operation in FIG. 2.
Figure 4:
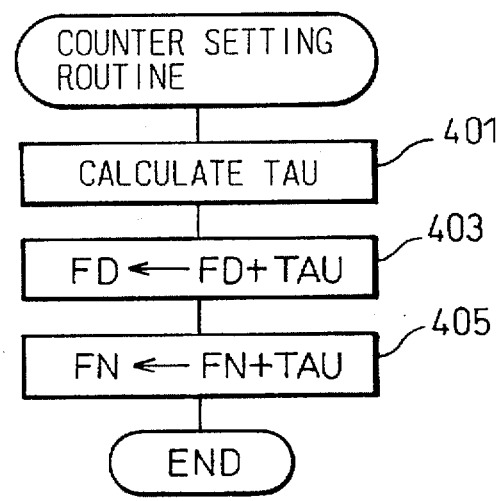
FIG. 4 is a flowchart illustrating a setting operation of the values of counters used in the flowchart in FIG. 3.

FIGS. 2 through 4 are flowcharts explaining embodiments of routines performed by the control circuit 20 for controlling regenerating operations of the DPF 7 and $NO_x$ absorbent 9.

FIG. 2 is a routine for conducting the regenerating operations of the DPF 7 and $NO_x$ absorbent 9. This routine is performed at regular intervals. In FIG. 2, at step 201, it is determined whether a value of a flag ADPF is set to 1. ADPF is a regenerating flag of the DPF 7, and the value thereof is set to 1 by the routine in FIG. 3 when the conditions for conducting the regenerating operation of the DPF 7 are satisfied. If ADPF=1 at step 201, since the regenerating operation of the DPF 7 is required, the routine executes step 203 to close the intake shutter valve 6 to a predetermined degree of opening and to activate the electric heater 5a of the oxidizing catalyst 5. After executing step 203, the routine determines at step 205 whether the value of a flag ANOX is set to 1. ANOX is a regenerating flag of the $NO_x$ absorbent 9. Similarly to the flag ADPF, the value of the flag ANOX is set to 1 in the routine in FIG. 3 when the conditions for conducting the regenerating operation of the $NO_x$ absorbent 9 are satisfied.

If ANOX≠1 at step 205, i.e., if only the conditions for conducting the regenerating operation of the DPF 7 are satisfied, and the conditions for conducting the regenerating operation of the $NO_x$ absorbent 9 are not satisfied, the routine proceeds to step 207 to calculate the required additional fuel injection amount TAU21 in accordance with the engine speed and the accelerator signal (i.e., the amount of depression of the accelerator pedal). The additional fuel injection amount TAU21 represents the amount of fuel injected during the exhaust cycle of each cylinder in addition to the normal fuel injection during the compression cycle. TAU21 is determined in such a manner that the air-fuel ratio of the exhaust gas becomes a predetermined lean value (for example, about 20). More specifically, at step 207, an intake air amount Q is determined in accordance with the degree of opening of the intake shutter valve 6 and the engine speed, and the normal fuel injection amount TAU is determined in accordance with the engine speed and the accelerator signal, then the value of TAU21 is determined in accordance with Q and TAU so that the air-fuel ratio of the exhaust gas becomes a predetermined lean value (about 20) by the total amount (TAU+TAU21) of fuel injection.

At step 209, the value of the actual fuel injection amount TAU2 of the additional exhaust cycle fuel injection is set to the value TAU21 calculated at step 207.

When the value of TAU2 is set to TAU21, an amount TAU21 of fuel is injected to each cylinder during its exhaust cycle by a fuel injection routine (not shown) processed by the control circuit 20, and a total amount TAU+TAU21 of fuel is supplied to each cylinder in a cycle. Thus, the air-fuel ratio of the exhaust gas discharged from the cylinders becomes a lean value of about 20.

In this case, since the intake shutter valve 6 is closed, and since the amount of fuel supplied to the cylinders is increased by the amount TAU21, a lean air-fuel ratio exhaust gas having temperature higher than the normal temperature, and containing a relatively large amount of $NO_2$ generated by the oxidizing catalyst 5, flows into the DPF 7. Therefore, the carbon particles collected by the DPF 7 are burned by $NO_2$ in the exhaust gas, i.e., the DPF 7 is regenerated. Further, NO generated by the combustion of carbon particles is absorbed by the $NO_x$ absorbent 9.

On the other hand, if ANOX=1 at step 205 in FIG. 2, i.e., if the conditions for regenerating the $NO_x$ absorbent 9, as well as the conditions for regenerating the DPF 7, are satisfied, the routine executes step 215 to calculate the additional fuel injection amount TAU22 based on the engine speed and the accelerator signal in the manner similar to that in step 207. However, in this case, the value of TAU22 is determined so that the air-fuel ratio of the exhaust gas becomes a predetermined rich value (for example, an air-fuel ratio of about 13). After calculating the required additional fuel injection amount TAU22, the actual value of the additional fuel injection amount TAU2 is set to TAU22 at step 217 and, thereby, the air-fuel ratio of the exhaust gas discharged from the cylinders becomes a predetermined rich value (about 13, in this embodiment). In this case, since the intake shutter valve 6 is closed, and since the amount of fuel supplied to the cylinders are largely increased, a rich air-fuel ratio exhaust gas having a higher temperature than that in the normal regenerating operation of the DPF 7, and containing a relatively large amount of HC and CO flows into the DPF 7 and $NO_x$ absorbent 9. In this condition, since the amount of $O_2$ contained in the exhaust gas is very small, the regeneration of the DPF 7 is temporarily interrupted. However, in this condition, since the $NO_x$ absorbent 9 is regenerated by this rich air-fuel ratio exhaust gas having a high temperature, sulfate as well as $NO_x$ in the $NO_x$ absorbent 9 is released from the absorbent. Thus, the $NO_x$ absorbent 9 is completely regenerated, and the absorbing capability of the $NO_x$ absorbent 9 is completely resumed.

If ADPF≠1 at step 201 in FIG. 2, i.e., if the conditions for conducting regenerating operation are not satisfied, the routine executes step 211 to open the intake shutter valve 6 and to deactivate the electric heater 5a. Then, at step 213, it is determined whether the value of ANOX is set to 1. If ANOX=1 at step 213, i.e., if the conditions for conducting the regenerating operation of the $NO_x$ absorbent 9 are satisfied while the conditions for conducting the regenerating operation of the DPF 7 are not satisfied, the value TAU22 is calculated at step 215, and the actual value of the additional fuel injection amount TAU2 is set to the calculated value TAU22 at step 217. In this case, since the intake shutter valve 6 is opened, and since the electric heater 5a is deactivated, a rich air-fuel ratio exhaust gas having a relatively low temperature flows into the DPF 7 and $NO_x$ absorbent 9. Therefore, DPF 7 is not regenerated. Further, the $NO_x$ absorbent 9 is partially regenerated, i.e., sulfate in the $NO_x$ absorbent 9 is not released, although $NO_x$ absorbed in the $NO_x$ absorbent 9 is released and reduced.

If ANOX≠1 at step 213 in FIG. 2, i.e., if both the conditions for conducting the regenerating operations of DPF 7 and the $NO_x$ absorbent 9 are not satisfied, the actual value of the additional fuel injection amount TAU2 is set to 0 at step 219. Therefore, in this case, only the normal fuel injection during the compression cycle is conducted, and the air-fuel ratio of the exhaust gas becomes largely lean.

As explained above, in this embodiment, the following three kinds of regenerating operations are conducted by the control circuit 20. Namely, when only the conditions for conducting the regenerating operation of the DPF 7 are satisfied, the temperature of the exhaust gas is raised by the intake shutter valve 6 and the electric heater 5a, and the air-fuel ratio of the exhaust gas is decreased to a lean air-fuel ratio of about 20 by the additional fuel injection. Thus, only the DPF 7 is regenerated, and NO generated from the DPF 7 and $NO_2$ passing through the DPF 7 are absorbed by the $NO_x$ absorbent 9 and removed from the exhaust gas.

When both the conditions for conducting the regenerating operations of the DPF 7 and $NO_x$ absorbent 9 are satisfied, the temperature of the exhaust gas is further raised by the intake shutter valve 6 and by increasing the amount of the additional fuel injection, and the air-fuel ratio of the exhaust gas is further decreased (enriched) to a rich air-fuel ratio of about 13. Thus, the $NO_X$ absorbent 9 is regenerated completely by a rich and high temperature exhaust gas and, thereby, sulfate absorbed in the $NO_X$ absorbent 9 is released.

On the other hand, when only the conditions for conducting the regenerating operation of the $NO_X$ absorbent 9 are satisfied, the air-fuel ratio of the exhaust gas is decreased to a rich air-fuel ratio of about 13 by the additional fuel injection while keeping the intake shutter valve 6 open. Therefore, a relatively low temperature exhaust gas of a rich air-fuel ratio flows into the $NO_X$ absorbent 9, and $NO_X$ in the absorbent is released and reduced. However, in this condition, sulfate in the $NO_X$ absorbent 9 is not released from the absorbent.

Next, determination of the conditions for conducting the regenerating operations of the DPF 7 and $NO_X$ absorbent 9 is explained. FIG. 3 is a flowchart illustrating a routine for determining the conditions for conducting the regenerating operations. This routine is processed by the control circuit 20 at predetermined regular intervals. In this routine, the flags ADPF and ANOX are set to 1 when the respective conditions for conducting the regenerating operation are satisfied.

In FIG. 3, steps 301 through 307 are steps for setting the value of ADPF.

In this embodiment, a cumulative value of the amount of fuel supplied to the engine 1 is calculated, and regenerating operations of the DPF 7 is conducted when the cumulative value reaches predetermined value. It is considered that the amount of the carbon particles discharged from the engine is approximately proportional to the amount of fuel burned in the engine. Namely, the cumulative value of the fuel injection amount is considered to represents the amount of the carbon particles collected by the DPF 7. Therefore, in this embodiment, it is considered that the amount of carbon particles collected by the DPF 7 reaches a predetermined value when the cumulated value of the fuel injection amount reaches a predetermined value. Namely, when the cumulative value of the fuel injection amount reaches a predetermined value, the flag ADPF is set to 1 in order to conduct the regenerating operation of the DPF 7.

In FIG. 3, counters FD and FN are used as parameters which represent the cumulative value of the fuel injection amount. The values of the counters FD and FN are set by the routine in FIG. 4. The routine in FIG. 4 is processed by the control circuit 20 at a predetermined regular intervals, and increases the values of the counters FD and FN by the amount TAU (fuel injection amount in the normal operation of the engine) every time the routine is processed (steps 401 through 405 in FIG. 4). Therefore, the values of the counters FD and FN correspond to the cumulative value of the fuel injection amount TAU.

In FIG. 3, at step 301, it is determined whether the value of a counter FD exceeds a predetermined value $FD_0$. If $FD > FD_0$ at step 301, the value of the flag ADPF is kept at 1 for a predetermined time. Namely, if $FD > FD_0$ at step 301, the value of a counter TD is increased by 1 at step 307, and the value of the flag ADPF is kept at 1 until the value of the counter TD exceeds a predetermined value $TD_0$ at steps 309 and 313. When the value of the counter TD becomes larger than $TD_0$, the value of the counter FD is cleared at step 311, thereby, when the routine is next processed, steps 303 and 305 are executed to clear the value of the counter TD and to set the value of the flag ADPF to 0. Therefore, by executing steps 301 through 313, the regenerating operation of the DPF 7 in which the intake shutter valve 6 is closed and the additional fuel injection is performed is conducted by the routine in FIG. 2 for a predetermined time ($TD_0$) every time the cumulative value of the fuel injection amount reaches a predetermined value ($FD_0$).

The value $FD_0$ in step 301 is the amount of the carbon particles accumulated in the DPF 7 at which the regenerating operation should be conducted, and the value $TD_0$ is the time required for the regenerating operation vary in accordance with type and size of DPF 7. It is preferable to determine the actual values of $FD_0$ and $TD_0$ by experiment using an actual DPF. In this embodiment, for example, $FD_0$ is set to a value corresponding to six liters of fuel, and $TD_0$ is set to a value corresponding to 180 seconds of time.

Steps 315 through 327 in FIG. 3 are steps for setting the value of the flag ANOX. In this embodiment, similarly to the flag ADPF, the flag ANOX is set to 1 when the cumulative value FN reaches a predetermined value $FN_0$, and is kept at 1 for a predetermined time $TN_0$ (steps 315 through 327).

The amount of $NO_X$ generated by the engine 1 is considered proportional to the amount of fuel burned in the engine. Therefore, the amount of $NO_X$ absorbed in the $NO_X$ absorbent 9 is also considered proportional to the cumulative value of the fuel injection amount. Therefore, in this embodiment, similarly to the regenerating operation of the DPF 7, the regenerating operation of the $NO_X$ absorbent 9 is conducted every time the cumulative value of the fuel injection amount reaches a predetermined value. In steps 315 through 327, FN and TN are counters similar to the counters FD and TD, respectively, and $FN_0$ and $TN_0$ are predetermined threshold values similar to $FD_0$ and $TD_0$, respectively. The actual values of FN and TN vary in accordance with type and size of $NO_X$ absorbent 9, and are preferably determined by experiments using an actual $NO_X$ absorbent. In this embodiment, for example, $FN_0$ is set to a value corresponding 0.2 liters of fuel, and $TN_0$ is set to a value corresponding to 0.5 seconds of time.

By executing steps 315 through 327, the regenerating operation of the $NO_X$ absorbent 9 in which the amount of the fuel supplied to the engine is increased by the additional fuel injection is conducted by the routine in FIG. 2 for a predetermined time every time the amount of $NO_X$ absorbed in the $NO_X$ absorbent 9 reaches a predetermined value. Further, as explained in FIG. 2, the regenerating operation of the $NO_X$ absorbent 9 is conducted when the flag ANOX is set to 1 even when the regenerating operation of the DPF 7 is being carried out. Therefore, when the regenerating operation of the DPF 7 is being conducted, the $NO_X$ absorbent 9 is regenerated by the exhaust gas of higher temperature than that in the normal regenerating operation and, thereby, the $NO_X$ absorbent 9 is regenerated completely.

FIG. 5 is a timing diagram of the regenerating operation of DPF 7 and the regenerating operation of the $NO_X$ absorbent 9. FIG. 5 shows a case in which a diesel engine having a displacement of 2400 cubic centimeter is operated at a speed 2000 RPM and an output torque 80 newton-meter. In this case, assuming that $FD_0$ is six liters and that $FN_0$ is 0.2 liters, the regenerating operation of the DPF 7 is repeated at intervals of about 60 minutes, and the regenerating operation of the $NO_X$ absorbent 9 is repeated at intervals of about 2 minutes as shown in FIG. 5.

Further, if the periods of the regenerating operations of the DPF 7 and $NO_X$ absorbent 9 ($TD_0$ and $TN_0$) are set to about 3 minutes and 0.5 seconds, respectively, the regenerating operation of the $NO_X$ absorbent 9 is always conducted once or twice during the regenerating operation of the DPF 7 as shown in FIG. 5. Therefore, by setting the timing of the regenerating operations of the DPF 7 and $NO_x$ absorbent 9, the $NO_x$ absorbent 9 is regenerated periodically by the exhaust gas having a temperature higher than that of the normal regenerating operation and, thereby, $SO_3$ (sulfate) as well as $NO_x$ is released from the $NO_x$ absorbent 9 periodically. Thus, the absorbing capacity of $NO_x$ absorbent 9 can be maintained at a high level.

Though the additional fuel injection during the exhaust cycle is conducted during the regenerating operations in the above embodiment, the additional fuel may be supplied to the exhaust gas passage directly during the regenerating operations. In this case, an additional fuel injection valve is disposed in the exhaust gas passage upstream of the oxidizing catalyst 5, and the additional amount of fuel is injected into the exhaust gas passage upstream of the oxidizing catalyst 5.

Further, though the timing of the regenerating operations is determined by estimating the amount of the carbon particles accumulated in the DPF 7 and the amount of $NO_x$ absorbed in the $NO_x$ absorbent 9, the control of the regenerating operation can be simplified by conducting the regenerating operations at regular intervals regardless of the amount of carbon particles in the DPF 7 and the amount of $NO_x$ in the $NO_x$ absorbent 9.

Next, another embodiment of the present invention is explained with reference to FIG. 6. FIG. 6 is a drawing similar to FIG. 1 which illustrates another example of a device for conducting the method in the present invention. In FIG. 6, reference numerals same as those in FIG. 1 also designate same elements as those in FIG. 1. The device in FIG. 6 is different from the device in FIG. 1 in that an $NO_x$ reducing catalyst 10 is disposed in the exhaust gas downstream of the DPF 7 instead of $NO_x$ absorbent 9 in FIG. 1. The $NO_x$ reducing catalyst 10 is a catalyst which is capable of reducing $NO_x$ in the exhaust gas selectively even if the air-fuel ratio of the exhaust gas is lean. Namely, though NO in the exhaust gas is removed by collecting it by the $NO_x$ absorbent 9 in the previous embodiment, NO in the exhaust gas is directly reduced by the $NO_x$ reducing catalyst 10 in this embodiment.

The $NO_x$ reducing catalyst 10 in this embodiment has a substrate made of, for example, zeolite ZSM-5, and metals such as copper Cu and iron Fe are attached to the substrate by an ion exchange method. Alternatively, a substrate made of zeolite such as mordenite and precious metal such as platinum Pt attached thereon can also be used as the $NO_x$ reducing catalyst 10. The $NO_x$ reducing catalyst 10 selectively reduces $NO_x$ in the exhaust gas to $N_2$ when the air-fuel ratio of the exhaust gas is lean, by reacting HC and CO with $NO_x$ selectively. Namely, the $NO_x$ reducing catalyst 10 traps HC and CO in the exhaust gas in the pores of the porous zeolite, and selectively reduces the $NO_x$ in the exhaust gas using trapped HC and CO even if the air-fuel ratio of the exhaust gas flowing into the $NO_x$ reducing catalyst 10 is lean.

Therefore, in this embodiment, $NO_2$ in the exhaust gas generated by the oxidizing reducing catalyst 10 and NO generated at DPF 7 during the regenerating operation is reduced effectively by the $NO_x$ reducing catalyst 10 disposed in the exhaust gas downstream of the DPF 7. However, in order to reduce $NO_x$ in the exhaust gas effectively, it is required that a proper amount of HC and CO are trapped in the $NO_x$ reducing catalyst 10. The air-fuel ratio of the exhaust gas of a diesel engine is considerably lean in the normal operation, and only a very small amount of HC and CO are contained in the exhaust gas. Therefore, when the normal lean air-fuel ratio operation of the diesel engine continues for a certain period, HC and CO trapped in the $NO_x$ reducing catalyst 10 are used up in reducing $NO_x$ in the exhaust gas and, thereby, the ability of the $NO_x$ reducing catalyst for reducing $NO_x$ becomes low.

In order to prevent this problem, the air-fuel ratio of the exhaust gas is also lowered (enriched) periodically in this embodiment. Namely, the control circuit 20 performs routines similar to those in FIGS. 2 through 4 also in this embodiment, and controls the air-fuel ratio of the exhaust gas to a rich air-fuel ratio by conducting the additional fuel injection during the exhaust cycle of each cylinder. Similarly to the previous embodiment, fuel injected during the exhaust cycle is oxidized by the oxidizing catalyst 5 and generates a relatively large amount of HC and CO in the exhaust gas. Therefore, a proper amount of HC and CO are accumulated (trapped) in the $NO_x$ reducing catalyst 10, and $NO_x$ in the exhaust gas is reduced by these HC and CO components when the normal operation of the engine is resumed. The routines processed by the control circuit 20 in this embodiment for conducting the regenerating operation of the DPF 7 and for accumulating HC and CO are substantially the same as the routines in FIGS. 2 through 4. Therefore, a detailed explanation thereof are not repeated here.

As explained above, in the present invention, the diesel particulates from the diesel engine are collected by, for example, a DPF, and burned by $NO_2$ in the exhaust gas. Further, NO generated by the reaction between the carbon particles and $NO_2$ passing through the DPF 7 are removed from the exhaust gas by, for example, an $NO_x$ absorbent or an $NO_x$ reducing catalyst. Therefore, according to the present invention, the accumulated carbon particles can be easily removed from a DPF without increasing the amount of $NO_x$ released to the atmosphere.

We claim:

1. A method for purifying the exhaust of a diesel engine, comprising:

catalytically oxidizing nitrogen monoxide, hydrocarbons and carbon monoxide in the exhaust gas from a diesel engine to form an exhaust gas comprising nitrogen dioxide by contacting the exhaust gas with an oxidation catalyst when the air/fuel ratio of the exhaust gas is lean in fuel;

collecting carbon particulates contained in the exhaust gas in a diesel particulate filter;

removing nitrogen oxides out of the exhaust gas by sorbing the nitrogen oxides in an absorbent when the air/fuel ratio of the exhaust gas is lean in fuel;

periodically regenerating the diesel particulate filter by raising the temperature of the exhaust gas by activating an electric heater attached to said oxidation catalyst to a temperature high enough to promote the reaction between nitrogen dioxide and the carbon particulates contained in the diesel particulate filter so as to result in a regenerated diesel particulate filter and an exhaust gas rich in carbon oxides and nitrogen monoxide;

removing nitrogen monoxide from the filter regeneration out of the exhaust gas;

periodically regenerating the absorbent by intentionally shifting the air/fuel ratio of the exhaust gas to a fuel rich air/fuel ratio thereby temporarily terminating the catalytic oxidation of the hydrocarbons and carbon monoxide in the exhaust gas set forth in the first step and passing the resulting hydrocarbon and carbon monoxide rich exhaust gas into the absorbent where a reaction occurs between the hydrocarbons and carbon monoxide and the nitrogen oxides released in the absorbent to convert the nitrogen oxides into nitrogen.

2. A method according to claim 1, wherein said step for removing nitrogen monoxide from the exhaust gas comprises a step for collecting nitrogen monoxide in the exhaust gas by contacting the exhaust gas with an absorbent capable of absorbing nitrogen monoxide in the exhaust gas.

3. A method according to claim 1, wherein said step for removing nitrogen monoxide from the exhaust gas comprises a step for reducing nitrogen monoxide, in the exhaust gas, to nitrogen.

4. The method according to claim 1, wherein during the step for periodically regenerating the absorbent, the air/fuel ratio is shifted to a fuel rich air/fuel ratio by injecting fuel into each cylinder of said diesel engine two times during every complete cycle of each cylinder.

5. The method according to claim 4, wherein one of said two times of injecting fuel into each cylinder occurs during its exhaust cycle and the other of said two times of injecting fuel into each cylinder occurs during its compression cycle.

\* \* \* \* \*